(No Model.)  
N. LLOYD, Sr.  
BEE HIVE.  
2 Sheets—Sheet 1.
No. 284,312. Patented Sept. 4, 1883.
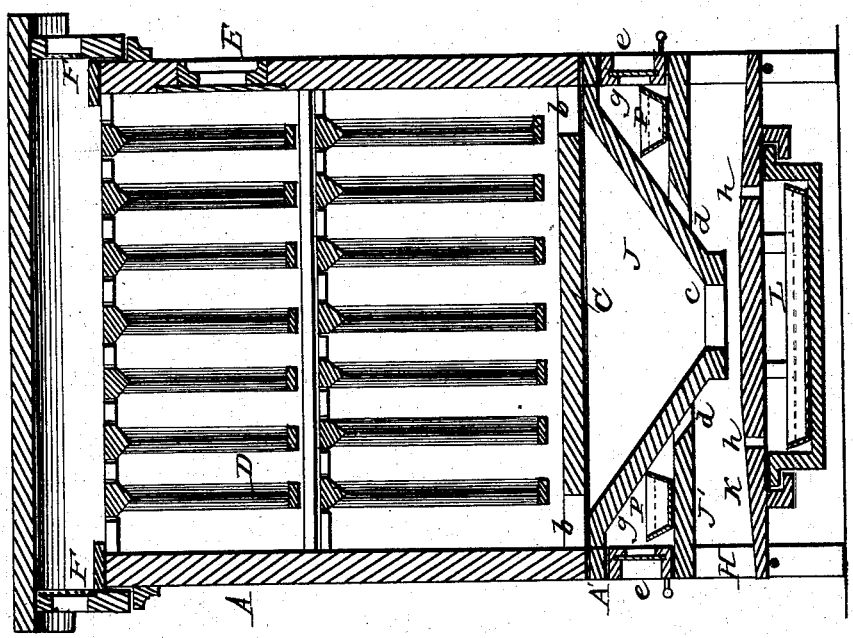
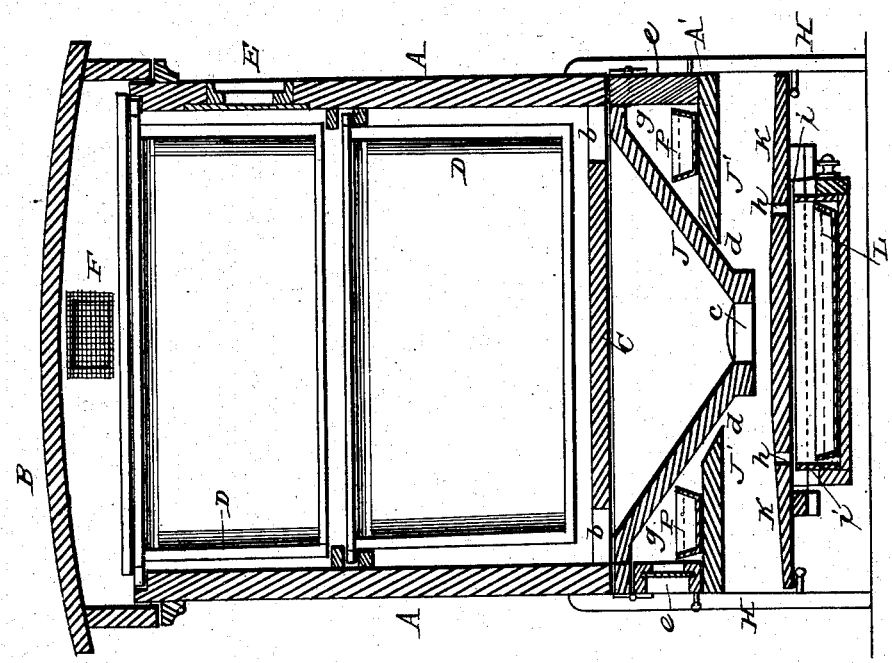
Witnesses  
Fred G. Dietrich  
Phil C. Dietrich
Inventor.  
Nathan Lloyd Sr,  
by J. M. Alexander  
Attorney.

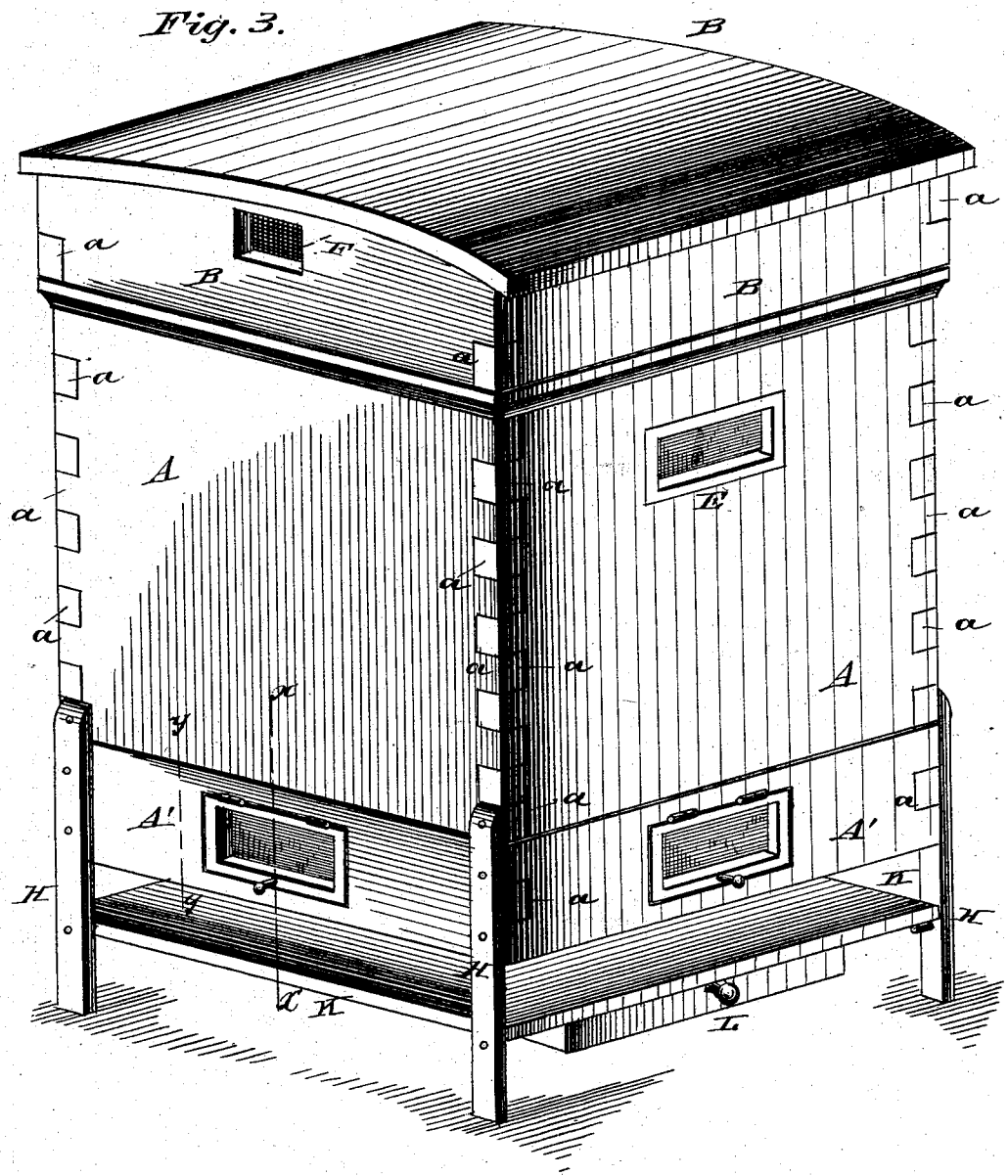

UNITED STATES PATENT OFFICE.

NATHAN LLOYD, SR., OF MAUMEE, INDIANA.

BEE-HIVE.

SPECIFICATION forming part of Letters Patent No. 284,312, dated September 4, 1883.

Application filed February 12, 1883. (No model.)

*To all whom it may concern:*

Be it known that I, NATHAN LLOYD, Sr., of Maumee, in the county of Jackson and State of Indiana, have invented certain new and useful Improvements in Bee-Hives; and I do hereby declare that the following is a full, clear, and exact description thereof, reference being had to the accompanying drawings, and to the letters of reference marked thereon, which form part of this specification, in which—

Figure 1 is a section taken vertically through the hive, one side being in a central plane, and the other side being in the plane $y\ y$, Fig. 3. Fig. 2 is a vertical section through one side of the center of the hive, taken in a plane at right angles to the sectional plane of Fig. 1. Fig. 3 is a perspective view of the outside of the hive.

This invention relates to certain novel improvements in bee-hives, which will be fully understood from the following description, when taken in connection with the annexed drawings.

The body A of the hive or hive-box is of rectangular form, and is composed of four vertical sides, which are united at their corners by interlocking tenons $a\ a$, cross-nailed in such manner that warping and opening of the joints are effectually prevented.

B designates the top of the hive, which is removable from the body, and is convex or pitched laterally, so as to shed water from the outside and sweat from the inside.

The bottom C of the body A is provided with slots $b$ at its ends and sides for the passage of the bees, and is nailed to the body A. Inside of the body A are arranged a series of removable comb-frames, D, the tops of which are in close relation to each other, and below these frames is another series of removable frames or racks for the bees to lodge in, which are separated by spaces, as shown in the drawings, Fig. 2.

The body A is provided with one or more glass-covered windows, E, and the removable top is provided at its ends with wire-gauze-covered ventilators F. The body A is mounted on a rectangular bottom section, A', which is fitted closely to the lower edges of said body and secured to it by means of screws passed through the legs H, by removing which the bottom A' can be detached from the body for the purpose of hiving a swarm of bees. The said section A' has two bottoms, one, J, of which is hopper-shaped, or like the frustum of a pyramid inverted, with a hole, $c$, centrally through it, and the other bottom, J', is flat, and has crevices $d$ surrounding the inclined sides of the hopper-shaped bottom J, the lower end of which latter extends below the bottom J' a short distance. Between said bottoms J J' is a chamber, $g$, having openings which are provided with illuminating-shutters $e$, and inside of the chamber $g$ are pans P, which are designed for catching moths, in which pans water, whey, or other liquid is put for the purpose of destroying the moths. Below the bottom J' is a table, K, which is suitably attached to the legs H, and constructed with inclined surfaces, and has numerous perforations, $h$, through it, which are arranged in the form of a square, and located beneath the passages $d$. These perforations $h$ are entrances to a moth-trap, L, which is beneath the table K, and made like a drawer, to be removed at pleasure. This moth-trap L is provided with glass windows $i\ i$ for admitting light, and it is also provided with a pan for containing a suitable fluid.

It will be seen from the above description that the bees enter the hive through the mouth $c$ of the hopper-shaped bottom J, and that the moths will enter the chamber $g$ through the crevices $d$, they being attracted therein by the light entering through the illuminating-shutters $e$. The moths in attempting to escape from the said chamber $g$ through the glass shutters will fall into the fluid in the pans arranged beneath these shutters and be killed.

It will also be seen that moths crawling up the inclined surfaces of the table K will be attracted into the trap L by the light shining through the perforations $h$.

It will also be seen that the inclined sides of the hopper-shaped bottom J will allow all dirt made by the working bees to roll down and escape at the opening $c$ and fall upon the table K, which also presents inclined dirt-discharging surfaces, as described. Thus it will be seen that the bees can easily keep their hive clean.

It will furthermore be seen that the bees can approach either of the four sides of the hive and alight on the table K. There being an upper and a lower series of racks, the brood will live in the lower series and make honey in the upper series. Consequently the honey can be removed without disturbing the bees. In very cold weather the bees may be protected by a piece of woolen cloth placed over the top racks.

Having thus fully described my invention, what I claim as new, and desire to secure by Letters Patent, is—

1. The combination of the hive-body, the detachable section A', having a hopper-shaped bottom and a false bottom, forming, with a chamber, g, and passages d, a moth-trap, the table K beneath the said false bottom, having perforations through it, and an illuminated moth-trap applied to the bottom of said table, all constructed and adapted to operate substantially in the manner and for the purposes described.

2. In a bee-hive, the combination of an inverted hopper-shaped bottom, a table having inclined upper surfaces, and perforated as described, and an illuminated moth-trap below the perforations through said table, all arranged substantially as described and shown.

3. The combination of the hive-body A, having a doubly-inclined removable roof, a removable section, A', having a hopper-shaped bottom, J, through which is an opening, c, a horizontal bottom, J', a chamber, g, illuminating-doors e, passages d, the table K, perforated at h, and the illuminated moth-traps L, all constructed and adapted to operate substantially in the manner and for the purposes described.

In testimony that I claim the foregoing as my own I affix my signature in presence of two witnesses.

NATHAN LLOYD, Sr.

Witnesses:
 JONATHAN T. TODD,
 DAVID J. CUMMINGS.